United States Patent

Krajewski et al.

(10) Patent No.: US 7,766,414 B2
(45) Date of Patent: Aug. 3, 2010

(54) MIXED METAL CLOSURE ASSEMBLY AND METHOD

(75) Inventors: Paul E. Krajewski, Sterling Heights, MI (US); James G. Schroth, Troy, MI (US); Chongmin Kim, Bloomfield Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1072 days.

(21) Appl. No.: 11/067,613

(22) Filed: Feb. 25, 2005

(65) Prior Publication Data

US 2005/0188647 A1 Sep. 1, 2005

Related U.S. Application Data

(60) Provisional application No. 60/548,358, filed on Feb. 27, 2004.

(51) Int. Cl.
*B60J 5/00* (2006.01)

(52) U.S. Cl. .............. 296/146.6; 296/187.03; 296/146.5; 296/187.12; 296/193.03

(58) Field of Classification Search .............. 52/731.6, 52/793.1, 793.11; 296/146.4, 188, 187.12, 296/146.6, 146.5, 203.01, 202, 187.03, 193.03; 49/502

See application file for complete search history.

(56) References Cited

U.S. PATENT DOCUMENTS

| | | | |
|---|---|---|---|
| 4,803,108 A * | 2/1989 | Leuchten et al. ............ 428/118 |
| 5,398,453 A * | 3/1995 | Heim et al. ..................... 49/502 |
| 5,536,060 A | 7/1996 | Rashid et al. |
| 5,904,002 A * | 5/1999 | Emerling et al. ............... 49/502 |
| 5,924,760 A * | 7/1999 | Krajewski et al. ......... 296/146.6 |
| 5,948,185 A * | 9/1999 | Krajewski et al. ............ 148/698 |
| 5,974,847 A | 11/1999 | Saunders et al. |
| 6,050,049 A * | 4/2000 | Kowalski et al. ........... 52/731.6 |
| 6,253,588 B1 | 7/2001 | Rashid et al. |
| 6,308,999 B1 * | 10/2001 | Tan et al. ..................... 293/109 |
| 6,508,035 B1 * | 1/2003 | Seksaria et al. ............... 49/502 |
| 6,805,397 B1 * | 10/2004 | Chernoff et al. .......... 296/146.2 |
| 6,942,281 B2 * | 9/2005 | Omori et al. .............. 296/187.1 |
| 6,969,107 B2 * | 11/2005 | Omori et al. ............. 296/146.6 |
| 7,125,067 B2 * | 10/2006 | Bonnett et al. ........... 296/146.6 |
| 7,363,750 B2 * | 4/2008 | Seksaria et al. ............... 49/502 |
| 2003/0101656 A1 * | 6/2003 | Seksaria et al. ............... 49/502 |
| 2004/0049989 A1 * | 3/2004 | Florentin et al. .............. 49/502 |

* cited by examiner

*Primary Examiner*—Richard E Chilcot, Jr.
*Assistant Examiner*—Chi Q Nguyen
(74) *Attorney, Agent, or Firm*—Quinn Law Group, PLLC

(57) ABSTRACT

The production of lightweight closure assemblies with a selection of materials optimized to have sufficient formability for each component of the closure assembly, while providing the necessary performance standards at a lighter weight. A mixed metal vehicle closure assembly with an inner panel and an outer panel operatively connected to one another such that they define a cavity therebetween. The closure assembly includes a unitary reinforcement panel attached to the inner and outer panels and inside the cavity therebetween. At least one of the inner, outer and unitary reinforcement panels is composed of a first type of sheet metal and at least one other of the remaining inner, outer or unitary reinforcement panel is composed of a second type of sheet metal.

11 Claims, 1 Drawing Sheet

MIXED METAL CLOSURE ASSEMBLY AND METHOD

CROSS REFERENCE TO RELATED APPLICATIONS

This Application claims the benefit of U.S. Provisional Application No. 60/548,358 filed Feb. 27, 2004, which is hereby incorporated by reference in its entirety.

TECHNICAL FIELD

This invention relates to an optimized lightweight vehicle closure panel assembly composed of mixed sheet metals.

BACKGROUND OF THE INVENTION

A vehicle closure assembly such as a door typically includes an outer panel, an inner panel, and numerous reinforcements such as a hinge reinforcement, a latch reinforcement, and an impact bar. Vehicle doors are typically made of stamped steel. This invention enables the production of lightweight closure panels with a selection of materials optimized to have sufficient formability for each component of the closure assembly, while providing the necessary performance standards at a lighter weight.

SUMMARY OF THE INVENTION

In one aspect of the invention, a method of making a multi-panel, lightweight vehicle closure assembly with enhanced structural integrity is provided, comprising forming a first panel from sheet metal comprised of age-hardenable aluminum alloy, forming a second panel from sheet metal comprised of magnesium, forming a third panel from sheet metal comprised of high strength aluminum alloy and assembling the first, second and third sheet metal panels into a vehicle closure assembly.

In another aspect of the invention, a closure assembly for a vehicle is provided comprising an inner panel, an outer panel operatively connected to the inner panel such that the inner panel and the outer panel define a cavity therebetween. A unitary reinforcement panel is attached to the inner panel and the outer panel and inside the cavity therebetween. At least one of the inner panel, outer panel and unitary reinforcement panel is made of a first sheet metal, and at least one other of the inner panel, outer panel or unitary reinforcement panel is made of a second sheet metal.

In another aspect of the invention, the first sheet metal is one of an age hardenable aluminum sheet metal and an age hardenable aluminum alloy sheet metal. In another aspect of the invention the second metal is a magnesium sheet metal, as distinguishable from die cast magnesium.

In another aspect of the invention, the outer panel is formed from aluminum alloy AA6111 or AA5083 sheet metal. The inner panel is formed from magnesium alloy AZ31 sheet metal. The unitary reinforcement panel is made from an aluminum alloy sheet metal in the 7XXX or 2XXX series. In another aspect of the invention, the unitary reinforcement panel is made of sheet metal from aluminum alloy AA5083 or superplastic formed or quick plastic formed magnesium alloy.

The materials are chosen to have sufficient formability for each component, while providing enhanced structural integrity and other standards of performance at a lighter weight.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENTS

Figure 1:
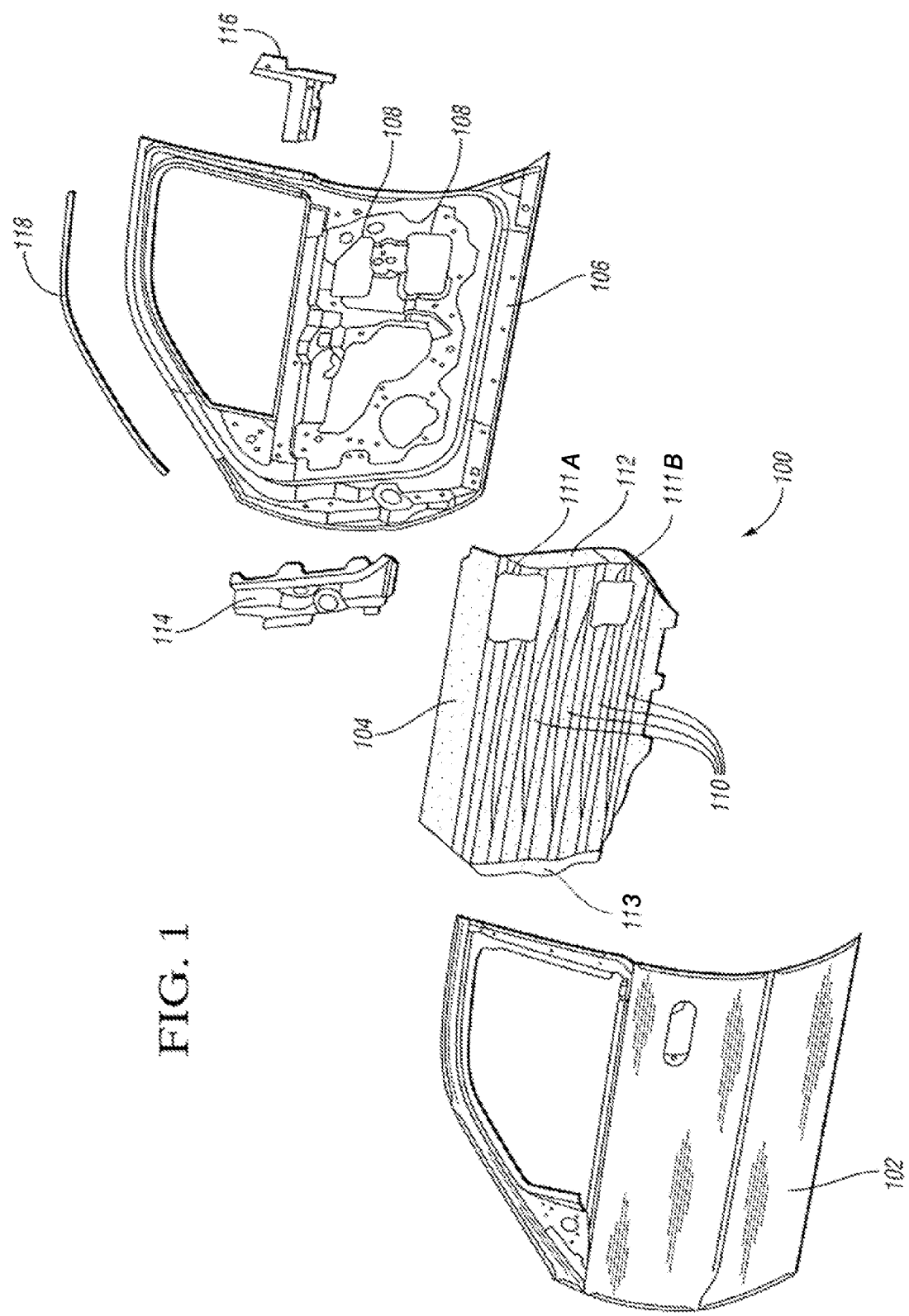
FIG. 1 is a schematic illustration in exploded view of a mixed metal door assembly.

The invention relates to a vehicle closure assembly composed of mixed sheet metals. The closure assembly described herein is a vehicle door. Within the scope of the invention, the closure assembly can be a decklid, hood or other closure assembly in a vehicle. Referring to FIG. 1, a mixed metal door assembly 100 is shown in exploded view. The door assembly 100 includes a door outer panel 102, a unitary reinforcement panel 104, and a door inner panel 106. The door assembly 100 is comprised of a variety of sheet metals chosen with adequate formability and to provide desirable product characteristics such as structural integrity and energy absorption features, at a lighter weight.

The door outer panel 102 is sheet metal made from an aluminum alloy (AA). The outer panel 102 may be formed by a variety of methods. Firstly, stamping or fluid hydroforming may be employed. In those instances, an age-hardenable alloy such as aluminum alloy AA6111 may be used. Age-hardenable alloys provide beneficial dent resistance performance. Secondly, superplastic forming (SPF) or quick plastic forming (QPF) may be employed to produce the door outer panel using an alloy such as AA5083 or another suitable alloy (Aluminum alloy AA5083 has a typical composition, by weight, of about 4% to 5% magnesium, 0.3 to 1% manganese, a maximum of 0.25% chromium, about 0.1% copper, up to about 0.3% iron, up to about 0.2% silicon, and the balance substantially all aluminum). Thirdly, thermal hydroforming or warm forming using a 5XXX series alloy such as 5182 may be used. A series of aluminum sheet alloys have previously been developed which are strong and hard due to the presence of precipitated, finely divided hardening particles. One such series is the AA2XXX series in which small amounts of copper and magnesium, for example, are added to the aluminum alloy to contribute to hardening particle formation. Another series is the AA6XXX series where silicon, magnesium and copper are added for hardening. A third series is the AA7XXX series where zinc, magnesium and copper, for example, are added as hardening constituents. These alloys are well known and commercially available.

The door inner panel 106 is sheet metal formed of sheet magnesium, distinguishable from die cast magnesium. Because component stiffness is a chief characteristic desirable for a door inner panel, magnesium sheet metal provides a light weight solution. The inner panel 106 may be formed by a variety of methods. For instance, the inner panel 106 may be formed using a quick plastic forming (QPF), superplastic forming (SPF) or warm forming process. A magnesium alloy such as AZ31 is suitable. As may be viewed in FIG. 1, the door inner panel 106 involves a complex shape, including a variety of openings 108 through which various door hardware is mounted.

The reinforcement panel 104 is sheet metal formed from a single sheet. The reinforcement panel 104 provides door intrusion resistance and may be made from a high strength aluminum alloy such as the 7XXX series (e.g. 7475) or 2XXX (e.g., 2004) series alloy. The reinforcement panel 104 may also be made with an AA5083 aluminum alloy or with a magnesium alloy that is SPF formed or QPF formed. The reinforcement panel 104 includes a plurality of strengthening corrugations 110. As shown in FIG. 1, the reinforcement panel 104 includes a plurality of apertures 111A and 111B, which may be used for the mounting of hardware. A sidewall 112 extends from a periphery of the panel 104 to provide reinforcement at the area of the door latch (not shown). Additionally or alternatively, a similar second sidewall 113 (shown in FIG. 1) may be formed at the opposing side of the panel to reinforce the front hinge position. The reinforcement panel 104 is welded, adhesively bonded or otherwise mechanically attached to the door inner panel 106 and the door outer panel 102. U.S. Pat. No. 5,536,060, issued Jul. 16, 1996 to Rashid et al. and commonly assigned to General Motors, which is hereby incorporated by reference in its entirety, describes a reinforcement panel that may be used in the door assembly 100.

The hardware opening 108 in the door inner panel 106 may alternatively be stamped or laser cut subsequent to the forming process. Additional door hardware or reinforcements such as a hinge reinforcement 114, a belt reinforcement 116 and a retainer 118 may be provided in the door assembly 100. These reinforcements 114, 116, 118 may be made from a variety of metals and/or by a variety of processes and may be attached to the inner panel 106, the outer panel 102 and/or the reinforcement panel 104 by a variety of joining techniques.

A number of applicable forming techniques are discussed herein.

Single Sheet QPF

Quick plastic forming (QPF) is described in U.S. Pat. No. 6,253,588, issued Jul. 3, 2001 to Rashid, et al and commonly assigned to General Motors, which is hereby incorporated by reference in its entirety. For quick plastic forming, a preferred alloy is Aluminum Alloy 5083. Generally, the alloy is first hot and then cold rolled to a thickness from about one to about four millimeters. In the AA5083 alloys, the microstructure is characterized by a principal phase of a solid solution of magnesium in aluminum with well-distributed, finely dispersed particles of intermetallic compounds containing the minor alloying constituents, such as $Al_6Mn$.

Using QPF, large AA5083-type aluminum-magnesium alloy sheet stock may be formed into a complex three-dimensional shape with high elongation regions, like a super-plastic formed (SPF) (discussed below) part, at surprisingly higher production rates than those achieved by SPF practices. The magnesium-containing, aluminum sheet is heated to a forming temperature in the range of about 400° C. to 510° C. (750° F. to 950° F.). The forming may often be conducted at a temperature of 460° C. or lower. The heated sheet is stretched against a forming tool and into conformance with the forming surface of the tool by air or gas pressure against the back surface of the sheet. The fluid pressure is preferably increased continuously or stepwise from 0 psi gage at initial pressurization to a final pressure of about 250 to 500 psi (gage pressure, i.e., above ambient pressure) or higher. During the first several seconds up to about, e.g., one minute of increasing pressure application, the sheet accommodates itself on the tool surface. After this initial period of pressurization to initiate stretching of the sheet, the pressure can then be increased at an even faster rate. Depending upon the size and complexity of the panel to be formed, such forming can normally be completed in a period of about two to twelve minutes, considerably faster than realized in superplastic forming. Thus, by working a suitably fine grained, aluminum alloy sheet at significantly lower temperatures and continuously increased, higher gas pressures than typical SPF practices, significantly faster and more practical forming times are achieved for the parts described herein and their equivalents. This particular QPF process described in U.S. Pat. No. 6,523,588 may be referred to as "single sheet" QPF.

Superplastic Forming

Where time is not of the essence, the sheet metal panels may also be formed by superplastic forming (SPF), as described in U.S. Pat. No. 5,974,847, issued Nov. 2, 1999 to Saunders, et al and commonly assigned to General Motors, which is hereby incorporated by reference in its entirety. When certain alloy compositions of steel or aluminum are suitably processed (such as with a very fine grain microstructure), they exhibit superplastic behavior at certain elevated temperatures. When deformed at these temperatures, the ductility (or elongation before yield or failure) of these materials exceeds several hundred percent. Such high levels of ductility can enable fabrication of very complex structures in a single sheet of material.

Materials

In addition to various steels and aluminum alloys, other structural materials such as zinc, brass, magnesium, titanium and their alloys are known to exhibit superplastic behavior. These materials and other metal matrix composites could also be used to make complex shapes.

In an example of superplastic forming, a blank, i.e., a sheet, is tightly clamped at its edges between complementary surfaces of opposing die members. At least one of the die members has a cavity with a forming surface opposite one face of the sheet. The other die opposite the other face of the sheet forms a pressure chamber with the sheet as one wall to contain the working gas for the forming step. The dies and the sheet are heated to a suitable SPF condition for the alloy. For SPF aluminum alloys, this temperature is typically in the range of 400° C. to 550° C. Electric resistance heating elements are located in press platens or sometimes embedded in ceramic or metal pressure plates located between the die members and the platens. A suitable pressurized gas such as argon or air is gradually introduced into the die chamber on one side of the sheet, and the hot, relatively ductile sheet is stretched at a suitable rate until it is permanently reshaped against the forming surface of the opposite die. The rate of pressurization is controlled so the strain rates induced in the sheet being deformed are consistent with the required elongation for part forming. Suitable strain rates are usually 0.0001 to 0.01 s-1. During the deformation of the sheet, gas is vented from the forming die chamber.

The '847 patent provides a method of stretch forming a ductile metal sheet into a complex shape involving significant deformation without excessive thinning of the sheet material and without tearing it. The method is particularly applicable to the stretch forming of superplastic alloys heated to a superplastic forming temperature. In the method, additional material from the initially flat sheet blank is pulled or drawn into the forming cavity for stretch forming. The additional material significantly reduces thinning and tearing in the formed part.

The method contributes to thickness uniformity in an SPF stretch-formed component by utilizing controlled draw-in of sheet metal to the forming chamber prior to application of gas pressure. In an illustrative practice, a preform, similar to a stationary male punch, is placed on the forming press platen opposite the die cavity. An aluminum blank, for example, is placed over the insert and heated to a suitable SPF temperature for the alloy. The die is then moved toward its closed position against the platen. In its closing motion, the die engages the edges of the aluminum sheet. The heated metal is pulled over and around the insert, and draw-in of blank material thus occurs. This results in a greater amount of metal in the die cavity prior to SPF blow forming. The quantity of additional metal can be managed by design of the size, shape and location of the preform on the platen or complementary die member. But the additional metal in the die cavity reduces the amount of strain required and, hence, the amount of thinning to form a desired geometry compared to conventional SPF.

Thus, by the judicious use of a suitable space-occupying sheet metal preform on a die or platen member opposite the forming die, additional metal is easily drawn into the cavity during die closure without significantly increasing the complexity of the tooling. Care is taken in the design of the preform to avoid excessive wrinkling of the drawn-in metal and to maintain a tight gas seal at the periphery of the sheet upon full die closure. The uniformity in thickness of the stretch-formed part is improved. Mass of the formed part can be reduced because the designer does not need to resort to thicker blanks to assure part quality. And, except for the simple preform, there is no increase in the complexity of the SPF tooling.

While the best modes for carrying out the invention have been described in detail, those familiar with the art to which this invention relates will recognize various alternative designs and embodiments for practicing the invention within the scope of the appended claims.

The invention claimed is:

1. A closure assembly for a vehicle comprising:
   an inner panel that is made from magnesium alloy AZ31 sheet metal;
   an outer panel, operatively connected to the inner panel such that said inner panel and said outer panel define a cavity therebetween;
   a unitary reinforcement panel attached to said inner panel and said outer panel and inside said cavity;
   wherein one of said outer panel and said unitary reinforcement panel is made of a first type of sheet metal;
   wherein the other of said outer panel and said unitary reinforcement panel is made of a second type of sheet metal, the second type being different from the first type;
   wherein said outer panel and said unitary reinforcement panel are not made from magnesium alloy AZ31 sheet metal;
   wherein said unitary reinforcement panel is characterized by stiffening corrugations and defines a plurality of apertures for mounting of hardware;
   wherein said unitary reinforcement panel at least partially defines a sidewall extending laterally from the periphery of said unitary reinforcement panel; and
   wherein said unitary reinforcement panel at least partially defines a second sidewall on an opposing side of said unitary reinforcement panel.

2. The vehicle closure assembly of claim 1, wherein said first type of sheet metal is one of an age hardenable aluminum sheet metal and an age hardenable aluminum alloy sheet metal.

3. The vehicle closure assembly of claim 1, wherein said outer panel is made of aluminum sheet metal.

4. The vehicle closure assembly of claim 1, wherein said outer panel is made from aluminum alloy AA6111 sheet metal.

5. The vehicle closure assembly of claim 1, wherein said outer panel is made from aluminum alloy AA5083 sheet metal.

6. The vehicle closure assembly of claim 1, further comprising door hardware operatively connected to said inner panel at the plurality of apertures and at least partially located within the cavity.

7. The vehicle closure assembly of claim 1, wherein said inner panel and said outer panel at least partially define a window opening; and wherein said inner panel and said outer panel each include a window frame at least partially defining the window opening.

8. The vehicle closure assembly of claim 1, wherein said unitary reinforcement panel is made from an aluminum alloy sheet metal in the 7XXX series.

9. The vehicle closure assembly of claim 1, wherein said unitary reinforcement panel is made from an aluminum alloy sheet metal in the 2XXX series.

10. The vehicle closure assembly of claim 1, wherein said unitary reinforcement panel is made from aluminum alloy AA5083 sheet metal.

11. The vehicle closure assembly of claim 1, further comprising reinforcements attached to said inner panel, said outer panel and said unitary reinforcement panel.

* * * * *